United States Patent
Wagstaff

Patent Number: 6,104,672
Date of Patent: Aug. 15, 2000

[54] GENERAL FLUCTUATION SENSITIVE FILTER

[75] Inventor: Ronald A. Wagstaff, Slidell, La.

[73] Assignee: The United States of America as represented by the Secretary of the Navy, Washington, D.C.

[21] Appl. No.: 09/069,856

[22] Filed: Apr. 30, 1998

[51] Int. Cl.$^7$ .................................................. G01S 3/80
[52] U.S. Cl. .......................... 367/119; 367/103; 367/135
[58] Field of Search ..................................... 367/103, 119, 367/135, 129, 901; 364/724.011, 724.05; 342/368

[56] References Cited

U.S. PATENT DOCUMENTS 5,724,270   3/1998   Posch ...................................... 367/119

*Primary Examiner*—Ian J. Lobo
*Attorney, Agent, or Firm*—Thomas E. McDonnell; Edward F. Miles

[57] ABSTRACT

An apparatus and method for filtering the effects of large amplitude signal fluctuations from elements of the cross-spectral density matrix of a detector array. The outputs of the array are sampled T times, and the values of each element of the matrix formed by using:

$$\sum_{i=1}^{T} \{[Z_{1i}Z^*_{mi}]/|[Z_{1i}Z^*_{mi}]|^k\}$$

where $Z_{li}$ is the complex output of an sensor of the array at time i; $Z^*_{mi}$ is the complex conjugate of the output of an array sensor at said time i; and k is an integer greater than 1. Because of the exponent k, small, relatively constant, terms will dominate, reducing the effect of large amplitude fluctuations. Preferably, the above value will be scaled according to:

$$\left\{\sum_{i=1}^{T}|[Z_{1i}Z^*_{mi}]|^{-k} *\right\}^{-1}$$

which, besides being similarly filtered by the exponential terms, the resultant matrix element will have a magnitude corresponding to the actual power of the detected signal, after filtering.

4 Claims, 2 Drawing Sheets

GENERAL FLUCTUATION SENSITIVE FILTER

BACKGROUND OF THE INVENTION

A common scheme to detect signals, such as acoustic or electromagnetic radiation, is to deploy an array of sensors, and add their outputs coherently. Because noise is essentially random, and an informational signal is not, in a coherent sum the power from the signal adds cumulatively over the array, whereas the noise self cancels, increasing signal to noise for the array as a whole. A common expedient to beamforming is the cross-spectral density matrix. For an NxQ array of sensors, where N and Q are integers that are greater than zero and may equal 1 so long as both are not equal to one, the elements of this matrix are $Z_l Z_m^*$, where $Z_l$ is the complex output of the lth element of the array, and $Z_m^*$ is the conjugate of the complex output of the mth element. Beamforming is then conveniently done using a steering vector $S_v$, i.e.:

$$s(t) = (S_v)^T M S_v$$

where s(t) is the beamformed signal at time t, T indicates a transposed vector, and M is the cross-spectral density matrix. A typical set of elements for $S_v$ is $W_n e^{i\omega(n-1)\tau}$, where $\omega$ is the angular frequency of the signal, $\tau$ is the time of travel for the signal between consecutive elements in the array, $i = (-1)^{1/2}$, and $W_n$ a scalar associated with the nth array element, e.g. the gain of the element.

From this, it is plain that beamforming is a good approach to the detection of weak signals. Unfortunately, weak signals occur commonly in the presence of short-lived, large amplitude, noise, such as shot noise, or other forms of sensor self-noise, electric discharge in the vicinity of low amplitude electromagnetic communications, or surface waves or surface ships in the vicinity of submerged acoustic sources. One approach non-specific to beamformers has been to filter signals from a time series of detector outputs $x_1, \ldots, x_p$ according to the $AWSUM_z$ algorithm:

$$\left\{ \sum_{i=1}^{P} [x_i]^{(-1/z)} \right\}^{-z}$$

where z is a positive integer. See, U.S. application Ser. No. 08/314281, filed Sep 30, 1994 now abandoned and U.S. application Ser. No. 08/917964 filed Aug 27, 1997, now allowed. Because of the exponents, this is a sum of reciprocals, and only after the summation is the result re-inverted. As such, large amplitude fluctuations will have small reciprocals, and contribute little the summation. In this manner, the effect of these large noise excursions are filtered from the data. This approach, however, is incoherent in that it takes no account of the phase of the members of the time series. An attempt to do this is presented in U.S. Pat. No. 5,732,045 issued on Mar. 24, 1998 in which the real and imaginary portions of the time series are separately processed according to the above equation. However, an approach tailored to the specific problems of beamforming is needed. Hitherto, elements of the matrix have been filtered to an extent by taking data from the array at a series of times, forming the matrix for each time, and then averaging each value of the matrix over the times. As a practical matter this still leaves matrix elements susceptible to large noise fluctuations.

SUMMARY OF THE INVENTION

Accordingly, an object of the invention is attenuate large amplitude noise and from signals, particularly those generated pursuant to beamforming the output of a detector array.

Another object is to increase detector signal to noise thereby.

Another object is to attenuate detector self-noise.

Another object is to use both amplitude and phase information to improve signal detection.

Another object is to permit detection of weak signals, noteworthy among which is submerged, relatively stable, acoustic sources.

Another object is to permit systematic filtering of data usable to form the cross-spectral density matrix for a detector array.

In accordance with these and other objects made apparent hereinafter, the invention concerns an apparatus and method of detecting with of N sensors and a processor, in which the processor records the output of each of the sensors in complex form at a plurality of times T. The processor forms at least one term of at least one element of the cross-spectral density matrix for the array in accordance with the factor $$\sum_{i=1}^{T} \{ [Z_{li} Z_{mi}^*] / |[Z_{li} Z_{mi}^*]|^k \}$$

wherein $Z_{li}$ is the complex output of one of the sensors at time i; $Z_{mi}$ is the complex conjugate of the output of one of said sensors at said time i, and k is a real number greater than 1. Because of the exponent k, large amplitude fluctuations in any of the $Z_{li}$'s or $Z_{mi}$'s will cause these to contribute little to the summation. Preferably, this summation is scaled by a further term $$\left\{ \sum_{i=1}^{T} |[Z_{li} Z_{mi}^*]|^{-k} \right\}^{-1},$$

which makes the magnitude of the matrix element indicative of the power of the originally sampled signal.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
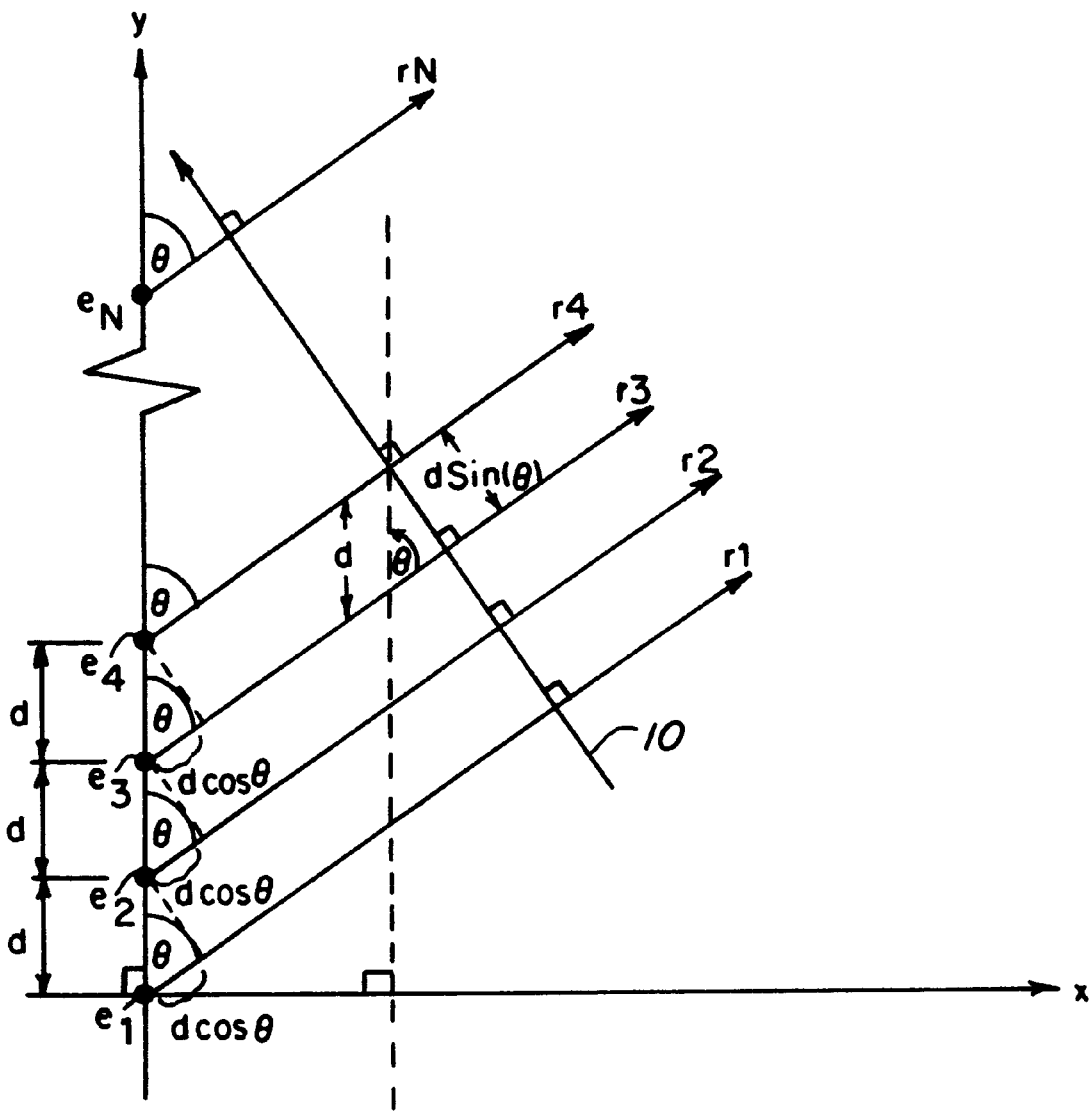
FIG. 1 is a plan diagram illustrating the basic problem of beamforming with a linear detector array.

With reference to the drawing figures, wherein like numbers indicate like parts throughout the several views, FIG. 1 shows a linear array of N detectors disposed along a direction x and separated from one another by a constant distance d, and in which the individual detectors of the array are denominated $e_1, e_2, \ldots, e_N$. A signal whose wavefront lies in a plane delimited by directions x, y, is illustrated traversing the array along direction 10, the wavefront having points of common phase disposed at angle θ with direction y. Directions $r_1, r_2, \ldots, r_N$ represent the points of common phase at the respective times the wavefront traverses each corresponding detector $e_n$, n=1, 2, ..., N. The wavefront in FIG. 1 is illustrated as effectively linear, which would be the case for a signal in the far field. As is seen from the geometrical relations of FIG. 1, the distance which the wavefront travels in going from one detector to the next is dSin(θ), and, if the wavespeed is c, then the time τ the wave takes to go from one detector to the other is τ=dSin(θ)/c.

Figure 2:
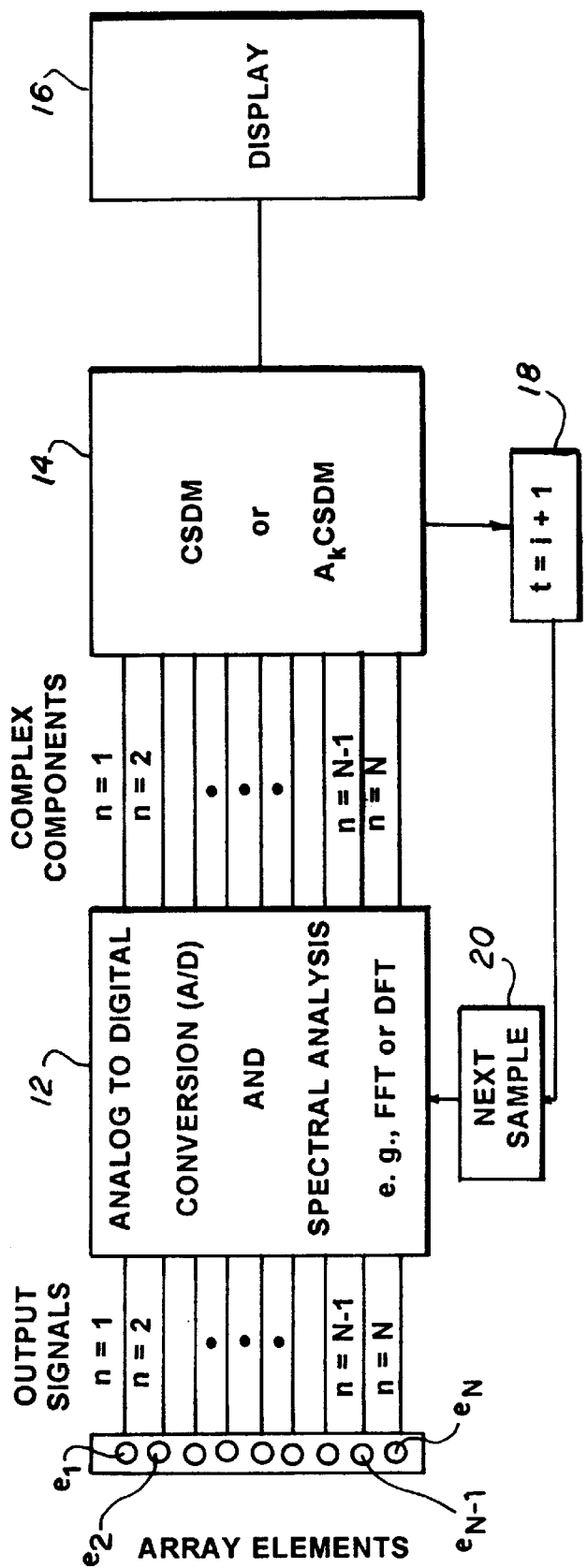
FIG. 2 is a schematic of apparatus for practicing an embodiment of the invention.

As the wavefront traverses the array, detectors $e_1 \ldots e_N$ measure the magnitude of the wavefront (pressure, if the wavefront is acoustic, voltage if it is electromagnetic, etc.), and directs its outputs to the system of FIG. 2, where processor 12 receives them. Processor 12, preferably a digital computer, samples the output from each of the N detectors, and in the conventional fashion converts them to inphase and quadrature form, i.e. complex form, and sorts the outputs spectrally by a fast or a discrete Fourier transform. From this, processor 14, preferably a digital computer (and most preferably part of the same processor as member 12), can form a cross-spectral density matrix, which can if desired be viewed in real time at display 16. Preferably, this sampling continues a number of times (18, 20) to permit accumulation of multiple realizations of each element of the cross-spectral density matrix.

Processor 12 filters the cross-spectral density matrix by replacing each element of the matrix by the following:

$$Z_{1,m} = \sum_{i=1}^{T} \{[Z_{1i}Z^*_{mi}]/|[Z_{1i}Z^*_{mi}]|^k\} \left\{\sum_{i=1}^{T} |[Z_{1i}Z^*_{mi}]|^{-k}\right\}^{-1}$$

where $Z_{l,m}$ is the element of lth row and mth column of the filtered cross-spectral density matrix, T is the number of time samples taken from each of the N detectors, i is an index associated with the time samples, i=1, 2, ..., T, $Z_{l,i}$ and $Z_{m,i}$ are the respective complex outputs from the lth and mth detectors at time i, l=1, 2, ..., N, m=1, 2, ..., N, k is an integer greater than 0, brackets | indicate the magnitude of the expression therebetween, and * indicates complex conjugate. If one defines $Z_{l,m,i} = Z_{li}Z_{mi}^+$, and $$r_{l,m,i} = |[Z_{1i}Z^*_{mi}]|,$$

the expression for $Z_{l,m}$ becomes:

$$Z_{1,m} = \left\{\sum_{i=1}^{T} [Z_{1,m,i}]/[(r_{1,m,i})^k]\right\}\left\{\sum_{i=1}^{T} [(r_{1,m,i})^{-k}]\right\}^{-1}$$

In the left hand summation term of this equation, $$\sum_{i=1}^{T} [Z_{1,m,i}]/[(r_{1,m,i})^k],$$

the denominator is large with respect to the numerator because of exponent k. Consequentially, terms in the left hand summation which are disproportionately large contribute little to the ultimate value of the summation. In this manner, the expression for $Z_{l,m}$ reduces the effect on measurements of $Z_{l,m}$ of data which are corrupted by large amplitude fluctuations. The right hand summation term, $$\left\{\sum_{i=1}^{T} (r_{1,m,i})^{-k}\right\}^{-1}$$

is preferably employed to ensure that the filtered values of $Z_{l,m}$ have magnitudes comparable to the raw phaser data from the detector elements. Doing this permits one to perform power calculation based on the beamformed signal derived from the cross-spectral density matrix, although if one is concerned only with detection of a stable, slowly varying, harmonic, and is unconcerned with its power, one could use the left hand summation, $$\sum_{i=1}^{T} \{[Z_{1,m,i}]/[(r_{1,m,i})^k]\},$$

alone.

As discussed above, the value of exponent k is selected to filter large amplitude fluctuations. One could, if desired, select k less than 1, in order to do the opposite, i.e. filter out slowly varying signals in favor of large fluctuating ones. For k=0, the expression for $Z_{l,m}$ reduces to conventional averaging.

As noted above, the processor 12 uses a fast or discrete Fourier transform to break up the signal detected by array elements $e_1, \ldots, e_N$ into its spectral intensities (signal magnitude as a function of frequency, or, here, as a function of a set of preselected frequency bins). This, too, is not strictly necessary, particularly if the rate at which the T samples are taken at each detector is more than twice the highest frequency component in the signal. For any sophisticated beamforming application, however, one preferably generates a cross-spectral density matrix for each frequency component in the signal (i.e. each frequency bin), filters each of these matrices according to the invention, beamforms each frequency bin separately, and then recombines (if one's application requires so doing) the beamformed spectral components to an overall beamformed signal.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

1. A detector comprising:
   an array of N sensors, N an integer greater than 1;
   a processor adapted to record the output of each of said sensors in complex form at a plurality of times T, T an integer greater than 1;
   said processor further adapted to form at least one term of at least one element of the cross-spectral density matrix for said array proportionate to:

$$\sum_{i=1}^{T} \{[Z_{1i}Z^*_{mi}]/|[Z_{1i}Z^*_{mi}]|^k\}$$

wherein:
   $Z_{li}$ is the complex output of a selected one of said sensors at time i;
   $Z_{mi}$ is the complex conjugate of the output of a selected one of said sensors at said time i; and
   k is a real number greater than 1.

2. The detector of claim 1, wherein said term of said at least one element of said cross-spectral density matrix is formed proportionate to:

$$\left\{\sum_{i=1}^{T}\{[Z_{1i}Z_{mi}^*]/|[Z_{1i}Z_{mi}^*]|^k\}\right\}\left\{\sum_{i=1}^{T}|[Z_{1i}Z_{mi}^*]|^{-k}\right\}^{-1}.$$

3. A method of detecting using an array of N sensors, N an integer greater than 1, and a processor, said method comprising:

adapting said processor to record the output of each of said sensors in complex form at a plurality of times T, T an integer greater than 1;

further adapting said processor to form at least one term of at least one element of the cross-spectral density matrix for said array proportionate to:

$$\sum_{i=1}^{T}\{[Z_{1i}Z_{mi}^*]/|[Z_{1i}Z_{mi}^*]|^k\}$$

wherein:

$Z_{li}$ is the complex output of a selected one of said sensors at time i;

$Z^*_{mi}$ is the complex conjugate of the output of a selected one of said sensors at said time i; and k is a real number greater than 1.

4. The method of claim 3, wherein said term of said at least one element of said cross-spectral density matrix is formed proportionate to:

$$\left\{\sum_{i=1}^{T}\{[Z_{1i}Z_{mi}^*]/|[Z_{1i}Z_{mi}^*]|^k\}\right\}\left\{\sum_{i=1}^{T}|[Z_{1i}Z_{mi}^*]|^{-k}\right\}^{-1}.$$

* * * * *